Aug. 9, 1927. 1,638,558
C. K. WOODBRIDGE
INDICATING MEANS AND THE LIKE
Filed Jan. 25, 1924
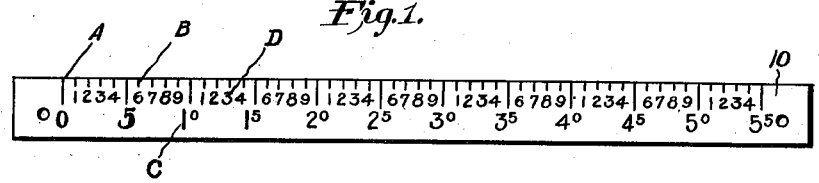
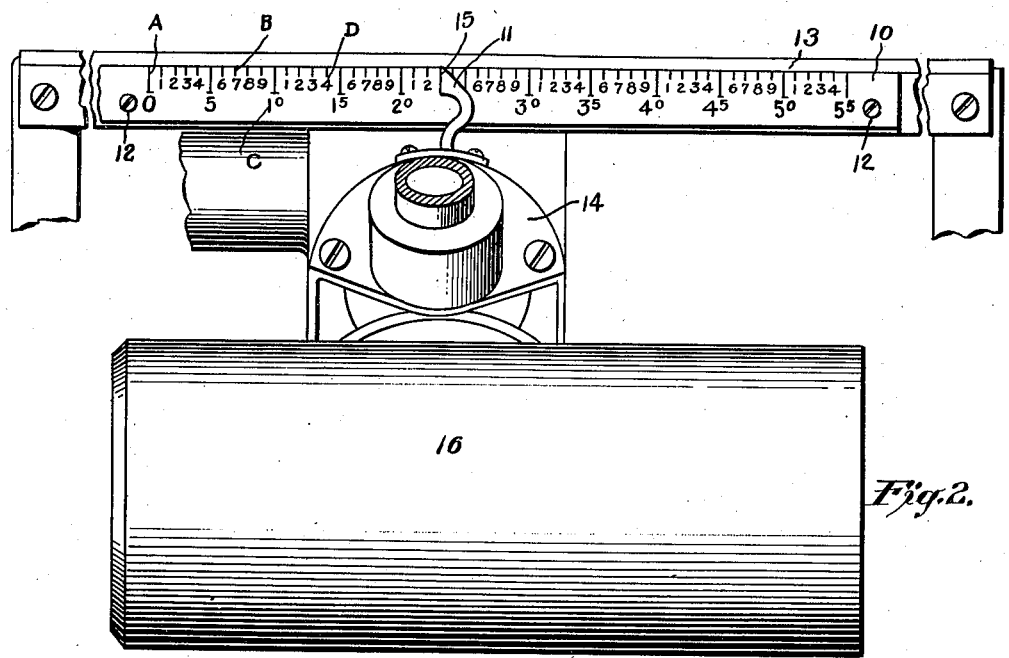
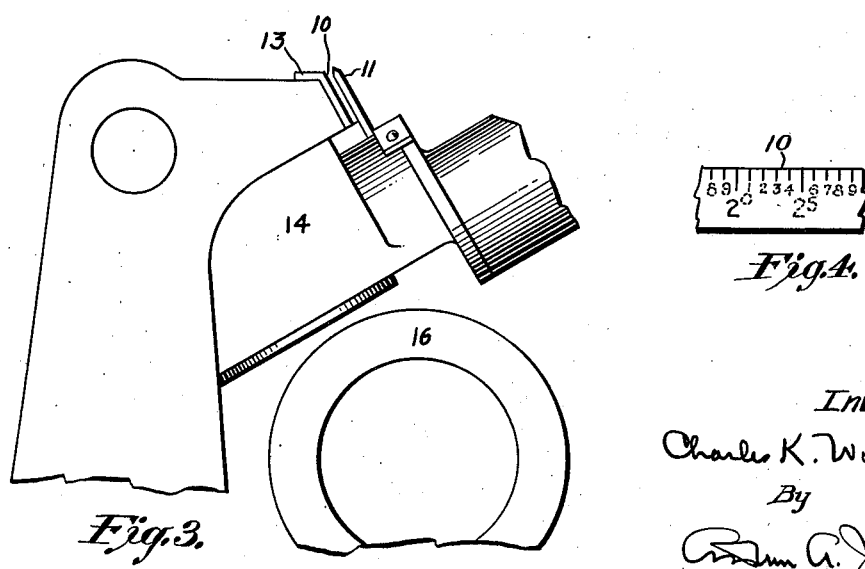
Inventor
Charles K. Woodbridge
By
Atty.

Patented Aug. 9, 1927.

1,638,558

UNITED STATES PATENT OFFICE.

CHARLES K. WOODBRIDGE, OF NEW YORK, N. Y., ASSIGNOR TO DICTAPHONE CORPORATION, OF BRIDGEPORT, CONNECTICUT, A CORPORATION OF NEW YORK.

INDICATING MEANS AND THE LIKE.

Application filed January 25, 1924. Serial No. 688,523.

This invention relates to indicating means and more particularly to indicating means used on dictating machines, typewriting machines, computing machines, et cetera.

One object of this invention is to provide indicating means which will enable the user of the machine, of which it forms a part, to accurately and quickly determine the position of a traveling element with relation to another element usually non-traveling.

Another object of this invention is to provide such indicating means which will enable the operator to accurately and quickly read the scale or other like device, and thus note the position of the traveling element with relation to the other element.

Another object of this invention is to provide an improved pointer for dictating and like machines using indicating means, which will not conceal the parts of the indicator or scale which are desired to be viewed but which will conceal those parts adjacent to the desired view-point which are undesired, to avoid error in reading.

Heretofore, indicating means of the kind referred to have included major-graduations which were designated by number and minor-graduations which were undesignated. In the use of such devices the operator was required to note the designation of the major-graduation and mentally add to it the number of minor-graduations between it and the indicator. This was extremely inconvenient to use and frequently caused errors to be made.

Now, the present invention overcomes these difficulties by providing the major-graduations with numerals or other designations, and by providing each subordinate-graduation with a related numeral or designation so that the operator may at a glance, without mental effort, determine the exact position desired.

Other objects and advantages will hereinafter appear.

In the accompanying drawing:

Figure 1 is a front elevation of the scale or indicating member of the present invention.

Fig. 2 is a plan view of the scale and pointer as applied to a dictating machine of the dictaphone type.

Fig. 3 is a side elevation of the scale and pointer as applied to a dictating machine.

Fig. 4 is a detail view showing how the scale appears to the operator.

As shown in the accompanying drawing the indicating means of this invention may comprise a scale bar 10 and a pointer 11. The scale bar 10 may be secured by screws 12 to vertical support 13 forming part of the frame of the "dictaphone" dictating machine. And, it is thus held against traveling movement while the pointer 11, which is mounted upon the sound-box carriage 14, moves longitudinally over the scale bar adjacent its surface.

According to the present invention, the scale bar 10 is provided with a series of relatively long major-graduations A and relatively shorter minor-graduations B. These cooperate with a straight-line surface 15 on the indicator 11 to show the positions of the sound-box carriage 14 with relation to the surface of the record 16. The scale is also provided with designating characters or numerals related to the major and minor graduations so that the zones between the minor-graduations each have a definite and predetermined number or letter. In the preferred form of the present invention numerals are used.

Heretofore, scale bars of this kind have been provided with designations for the major-graduations only, and it was necessary in reading the scale to add to the number shown by the major-graduation the sum of the minor-graduations between it and the pointer. For instance, if the pointer was located at the position shown in Fig. 2, (at "23") to the right of the major-graduation "20" it was necessary for the operator to add to this number "20" the number of minor-graduations, three in this case, between the pointer and "20" to know that the pointer indicates "23."

This method was confusing and consumed considerable time and distracted the operator's attention from the work at hand. To overcome these difficulties it was proposed to number each minor-graduation with the complete number of its position. But, this has been found to be undesirable because the numerals would have to be too small and could not be read at any considerable distance, especially at the distance which the operator is usually from the machine in its ordinary use. It was also found that the adjacent numbers ran together and made it so confusing that an operator could not at a glance tell whether the reading was "23" or "32" when the pointer was at "23", because the tens digit of the next numeral might be associated with the units figures of the preceding numeral to make "32". It should be remembered that the distance between minor-graduation to be at all satisfactory must be no more than one tenth of an inch and that to number each graduation would require numerals substantially less than .05 inches wide. These are entirely too small to be practical.

Now, according to the present invention, there is provided for each graduation, both the major and the minor from "6" upward, a relatively small figure C constituting the units digit of the designation associated with that particular point of the scale. These designations, therefore, run from "0" to "9", and continue repetitiously so to the end of the scale. The units designations C for the minor-graduations are located close to the edge of the scale, while the like designations for the major-graduations are placed midway of the edges of the scale at the ends of the major-graduations. They are of the same size as the designations for the minor-graduations, with the exception of the first two the "0" and the "5". Associated with the major-graduations from "10" upward, the tens digits D of the numerals are made about twice as large as units designations "C". This provision is made so that when looking at the minor-graduations the operator's vision also includes the larger digit of the adjacent major-graduation. Thus, in reading the position of the pointer as shown in Fig. 2 the operator sees that the pointer is at "3" and at the same time sees the large "2" of the "20" designation. Thus, without mental effort, the operator becomes aware of the fact that the pointer is at "23".

Obviously, the numerals may be made of any desired size within the physical limitations of the scale itself, but the tens digits D of the major-designations should be made so large that they will stand out clearly when the operator is reading the smaller numerals C of the minor-graduation when the pointer is four minor-graduations from the major-graduations. In fact it has been found that where the spaces are one-tenth of an inch apart the height of the large figures or numerals may be 5/32nds of an inch whereas the height of the small figures related therewith may be only 5/64ths of an inch.

To further explain the operation of this scale and indicator, Fig. 4 shows how the scale looks to the operator when his attention is focused upon one particular minor-graduation designation C. The tens figure D of the major graduation is shown in full lines whereas the units digits C of the major graduation and the digits C of the minor-graduations between it and the pointer are shown in dotted lines, the full lines indicating what the operator sees and the dotted lines what is unnoticed.

In the form shown, the graduations are shown along the upper edge of the scale, but, it should be clearly understood, the arrangement may be reversed and that the graduations might just as well be located along the lower edge of the scale bar.

In the accompanying drawing, the pointer or indicator 11 is shown as adapted to cover those parts of the scale which are immediately in advance of the reading point or the straight edge of the pointer and thus avoid any possible confusion of the operator by these designations.

The scale above described, as heretofore stated, is advantageously used with typewriting machines, weighing scales and other machines of like nature. But, it has particularly important features in connection with dictating machines. In dictating machines the scale and pointer are utilized to indicate to the operator a particular point on a sound record tablet so that further reference may be made to it either by a memorandum or by dictation upon the cylinder itself. Such a point is where a correction or change is to be made. It is, therefore, extremely important that the operator's attention to the matter at hand—dictation or the transcribing, as the case may be—be uninterrupted by any mental or physical effort to read the scale, and, consequently, anything that simplifies operation or reduces mental strain, such as the present scale and pointer, fills an important place in the advancement of the dictating machine art. Variations and modifications may be resorted to within the scope of this invention and portions of the improvements may be used without others.

What is claimed as new, and for which Letters Patent of the United States is desired, is:

As a new article of manufacture, a scale having major and minor graduations, each of the minor-graduations being provided with a numeral and each of the major-graduations being provided with a numeral having the tens digit larger than the units digit and larger than the minor-graduation numerals, the tens digit of the numeral for the major-graduation being adapted to be read with the relatively smaller numeral for the minor-graduation.

Signed at Bridgeport, in the county of Fairfield, and State of Connecticut, this 24th day of January, 1924.

CHARLES K. WOODBRIDGE.

CERTIFICATE OF CORRECTION.

Patent No. 1,638,558.  Granted August 9, 1927, to

CHARLES K. WOODBRIDGE.

It is hereby certified that error appears in the printed specification of the above numbered patent requiring correction as follows: Page 1, lines 52, and 62, the word "dictaphone" should be capitalized; and that the said Letters Patent should be read with this correction therein that the same may conform to the record of the case in the Patent Office.

Signed and sealed this 8th day of November, A. D. 1927.

Seal.

M. J. Moore,
Acting Commissioner of Patents